US011290366B2

(12) United States Patent
Matsumoto

(10) Patent No.: US 11,290,366 B2

(45) Date of Patent: Mar. 29, 2022

(54) COMMUNICATION APPARATUS AND COMMUNICATION METHOD

(71) Applicant: Oki Electric Industry Co., Ltd., Tokyo (JP)

(72) Inventor: Takuya Matsumoto, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 31 days.

(21) Appl. No.: 16/840,756

(22) Filed: Apr. 6, 2020

(65) Prior Publication Data

US 2020/0344148 A1 Oct. 29, 2020

(30) Foreign Application Priority Data

Apr. 23, 2019 (JP) ............................ JP2019-081930

(51) Int. Cl.
*H04L 12/751* (2013.01)
*H04L 45/02* (2022.01)

(52) U.S. Cl.
CPC .................................... *H04L 45/02* (2013.01)

(58) Field of Classification Search
CPC ....................................................... H04L 45/02
USPC ........................................... 370/256; 709/200
See application file for complete search history.

(56) References Cited

U.S. PATENT DOCUMENTS

| | | | | |
|---|---|---|---|---|
| 9,634,926 | B2 * | 4/2017 | Hatori | H04L 12/4625 |
| 2005/0060574 | A1 * | 3/2005 | Klotz | H04L 41/22 726/4 |
| 2005/0060598 | A1 * | 3/2005 | Klotz | G06F 11/2257 714/4.2 |
| 2005/0068565 | A1 * | 3/2005 | Maeda | H04L 29/12113 358/1.15 |
| 2005/0267989 | A1 * | 12/2005 | Yamamoto | G06K 15/00 709/245 |
| 2011/0276814 | A1 * | 11/2011 | Kamijima | G06F 1/3203 713/320 |
| 2020/0068486 | A1 * | 2/2020 | Asterjadhi | H04W 48/08 |
| 2020/0111220 | A1 * | 4/2020 | Delbruck | G06T 7/285 |

FOREIGN PATENT DOCUMENTS

JP 2004-297475 A 10/2004

* cited by examiner

*Primary Examiner* — Anthony Mejia

(74) *Attorney, Agent, or Firm* — Muncy, Geissler, Olds & Lowe, P.C.

(57) ABSTRACT

A communication device includes a communication part capable of communicating with a network device via a relay device; and a control part controlling an operation of the communication part such that, in a case where communication of the communication part fails, when the relay device is not a device that performs a route search operation using a spanning tree protocol, the communication part resumes communication with the network device after a first time period has elapsed, and, when the relay device is a device that performs the route search operation, the communication part resumes communication with the network device after a second time period longer than the first time period has elapsed.

14 Claims, 11 Drawing Sheets

COMMUNICATION APPARATUS AND COMMUNICATION METHOD

TECHNOLOGY FIELD

The present invention relates to a communication device and a communication method for communicating with a network device via a relay device.

BACKGROUND

In network communication, communication is often performed via a relay device. Some relay devices detect presence or absence of a loop transmission path by performing a route search operation using a spanning tree protocol (for example, Patent Document 1).

RELATED ART

[Patent Doc. 1] JP Laid-Open Patent Application Publication 2004-297475

For example, in a network environment in which a route search operation using a spanning tree protocol is performed, when a communication device performs network communication, for example, due to that another network device is connected to a relay device, a route search operation is performed and network communication may fail. Even in this case, it is expected that network communication is appropriately resumed.

It is desirable to provide a communication device and a communication method that allow network communication to be appropriately resumed.

SUMMARY

A communication device disclosed in the application includes a communication part capable of communicating with a network device via a relay device; and a control part controlling an operation of the communication part such that, in a case where communication of the communication part fails, when the relay device is not a device that performs a route search operation using a spanning tree protocol, the communication part resumes communication with the network device after a first time period has elapsed, and, when the relay device is a device that performs the route search operation, the communication part resumes communication with the network device after a second time period longer than the first time period has elapsed.

A communication method disclosed in the application includes establishing a communication between a communication part and a network device via a relay device; determining that communication of the communication part has failed; determining whether or not the relay device is not a device that performs a route search operation using a spanning tree protocol; when the relay device is not a device that performs a route search operation using a spanning tree protocol, resuming the communication between the communication part and the network device after a first time period has elapsed; and when the relay device is a device that performs the route search operation, resuming the communication between the communication part and the network device after a second time period longer than the first time period has elapsed.

According to an embodiment of the communication apparatus or an embodiment of the communication method, in a case where communication of the communication part fails, when the relay device is not a device that performs a route search operation using a spanning tree protocol, the communication part resumes communication with the network device after a first time period has elapsed, and when the relay device is a device that performs the route search operation, the communication part resumes communication with the network device after a second time period longer than the first time period has elapsed. It becomes possible to more properly resume the network communication.

DETAILED DESCRIPTION OF THE PREFERRED EMBODIMENT(S)

In the following, an embodiment of the present invention is described with reference to the drawings.

<Embodiment> [Configuration Example]

Figure 1:
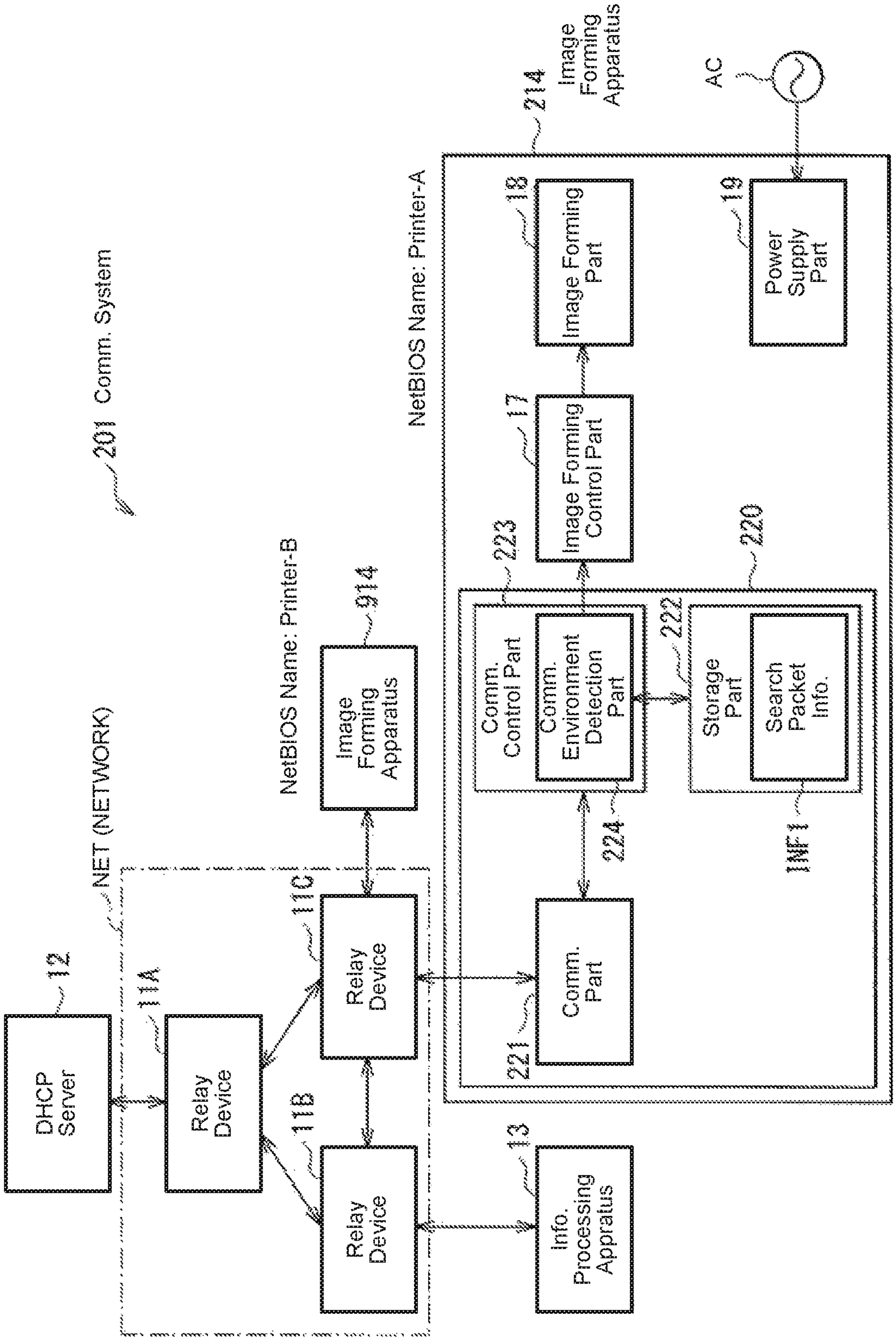
FIG. 1 is a block diagram illustrating a configuration example of a communication system according to an embodiment.

FIG. 1 illustrates a configuration example of a communication system 201 having a communication device according to an embodiment of the present invention. The communication system 201 is configured to include a network of a redundant configuration. A communication method according to an embodiment of the present invention is embodied by the present embodiment, and thus, will be described together. The communication system 201 includes multiple relay devices 11 (three relay devices 11A, 11B, 11C in this example), a DHCP (Dynamic Host Configuration Protocol) server 12, an information processing apparatus 13, an image forming apparatus 214, and an image forming apparatus 914.

The relay devices 11 are hubs for relaying network communication. The relay devices 11 each have multiple ports (not illustrated in the drawings) and are each configured to be able to connect to multiple network devices via the ports. The relay devices 11 control communication using a spanning tree protocol. Specifically, the relay devices 11 detect presence or absence of a loop transmission path by performing a route search operation using a spanning tree protocol. Then, the relay devices 11 control communication such that a network packet is not transmitted in a loop when there is a loop transmission path.

In this example, the relay device 11A is connected to the relay devices 11B, 11C and the DHCP server 12 via, for example, a LAN (Local Area Network) cable. The relay device 11B is connected to the relay devices 11A, 11C and the information processing apparatus 13 via, for example, a LAN cable. The relay device 11C is connected to the relay devices 11A, 11B and the image forming apparatuses 214, 914 via, for example, a LAN cable. As illustrated in FIG. 1, the relay devices 11A, 11B, 11C include a loop transmission path. That is, the relay devices 11A, 11B, 11C form a network (network NET) of a redundant configuration.

For example, when a network device (for example, the image forming apparatus 914) is newly electrically connected to the network NET, the relay devices 11A, 11B, 11C detect a loop transmission path by performing a route search operation using a spanning tree protocol. During a time period in which the route search operation is performed, the relay devices 11A, 11B, 11C interrupt communication with devices other than the relay devices 11A, 11B, 11C. Then, based on a processing result of the route search operation, the relay devices 11A, 11B, 11C control the communication such that a network packet is not transmitted in a loop.

The DHCP server 12 is configured to assign an IP (Internet Protocol) address to each of network devices connected to the network NET, such as the information processing apparatus 13 and the image forming apparatuses 214, 914. The DHCP server 12 is connected to the relay device 11A in this example. Then, based on a request from a network device, the DHCP server 12 assigns an IP address to the network device by communicating with the network device via the network NET.

The information processing apparatus 13 is a so-called personal computer in this example. The information processing apparatus 13 is connected to the relay device 11B in this example. The information processing apparatus 13 generates print data based on a user operation, and transmits the print data to, for example, the image forming apparatus 214 via the network NET.

The image forming apparatus 214 is configured to form an image on a recording medium such as a sheet of paper based on the print data. The image forming apparatus 214 is connected to the relay device 11C in this example. The image forming apparatus 214 forms an image on a recording medium based on the print data transmitted from the information processing apparatus 13 via the network NET. A NetBIOS name of the image forming apparatus 214 is set to “Printer-A”. The image forming apparatus 214 has a communication device 220, an image forming control part 17, an image forming part 18, and a power supply part 19.

The communication device 220 is connected to the relay device 11C, and is configured to communicate with the DHCP server 12 and the information processing apparatus 13 via the network NET. Specifically, the communication device 220 acquires an IP address assigned by the DHCP server 12 by communicating with the DHCP server 12 via the network NET. Then, for example, the communication device 220 communicates with the information processing apparatus 13 via the network NET using the IP address, and thereby, receives the print data transmitted from the information processing apparatus 13. The communication device 220 has a communication part 221, a storage part 222, and a communication control part 223.

The communication part 221 is configured to communicate with the DHCP server 12 and the information processing apparatus 13 by transmitting and receiving network packets via the network NET.

Further, as will be described below, when the relay devices 11A, 11B, 11C are performing a route search operation and are interrupting communication with devices other than the relay devices 11A, 11B, 11C, the communication part 221 intermittently transmits multiple search packets P for searching for the image forming apparatus 214 which is its own apparatus. In this case, the communication part 221 transmits the multiple search packets P by broadcast. In this example, the search packets P are each a network packet having a format of “NetBIOS Name Service”. In each of the search packets P, the “Queries” parameter is set to “Printer-A” which is the NetBIOS name of its own apparatus. The communication part 221 transmits the search packets P by broadcast using a port 137 of UDP (User Datagram Protocol).

In this example, a network packet having the format “NetBIOS Name Service” is used as a search packet P. However, the present invention is not limited to this. For example, a network packet used in a “Web Services on Devices (WSD)” protocol or a network packet used in a “multicast DNS” protocol may also be used as a search packet P.

The storage part 222 is a non-volatile memory. In the storage part 222, search packet information INF1 is stored. The search packet information INF1 includes information about a search packet P transmitted by the communication part 221.

The communication control part 223 is configured to control a communication operation of the communication device 220. The communication control part 223 is configured, for example, using a processor, a RAM (Random Access Memory), and the like. The communication control part 223 controls the communication part 221 to transmit a network packet to the DHCP server 12 to perform an IP address assignment request. When the communication part 221 receives a network packet that is transmitted from the DHCP server 12 and contains information about an assigned IP address, the communication control part 223 acquires the assigned IP address based on the network packet, and performs network setting based on this IP address. Then, the communication control part 223 controls the communication part 221 to communicate with network devices using this IP address. For example, the communication part 221 communicates with the information processing apparatus 13 using this IP address, and thereby, when print data transmitted from the information processing apparatus 13 is received, the communication control part 223 supplies the print data to the image forming control part 17.

Also, for example, when the relay devices 11A, 11B, 11C are performing a route search operation and are interrupting communication with devices other than the relay devices 11A, 11B, 11C, the communication control part 223 controls the communication part 221 to intermittently transmit multiple search packets P based on the search packet information INF1 stored in the storage part 222. Then, when the communication part 221 receives any one of the multiple search packets P, the communication control part 223 controls the communication part 221 to stop transmitting search packets P and start network communication.

The communication control part 223 has a communication environment detection part 224. The communication environment detection part 224 is configured to detect whether or not the communication device 220 is connected to a network in which a route search operation is performed using a spanning tree protocol. Specifically, when a predetermined number (for example, 3) of search packets P are transmitted and none of the predetermined number of search packets P is received, the communication environment detection part 224 determines that the communication device 220 is connected to a network in which a route search operation is performed using a spanning tree protocol. Then, the communication environment detection part 224 stores information indicating that the communication device 220 is connected to a network in which a route search operation is performed.

The image forming control part 17 is configured to control an operation of the image forming part 18 based on print data supplied from the communication device 220.

The image forming part 18 is configured to form an image on a recording medium such as a sheet of paper based on an instruction from the image forming control part 17.

The power supply part 19 is configured to generate power-supply power used in the communication device 220, the image forming control part 17 and the image forming part 18, based on AC power supplied from an AC power supply AC such as a commercial power supply. The power supply part 19 generates power-supply power, for example, when a user turns on a power switch. Then, the power supply part 19 supplies the generated power-supply power to the communication device 220, the image forming control part 17, and the image forming part 18.

Similar to the image forming apparatus 214, the image forming apparatus 914 is configured to form an image on a recording medium such as a sheet of paper based on print data. The image forming apparatus 914 is connected to the relay device 11C in this example. A NetBIOS name of the image forming apparatus 914 is set to "Printer-B".

With this configuration, in the communication system 201, for example, when the communication device 220 of the image forming apparatus 214 performs network communication with the information processing apparatus 13, when the image forming apparatus 914 is electrically connected to the relay device 11C, the relay devices 11A, 11B, 11C start a route search operation. As a result, the relay devices 11A, 11B, 11C interrupt communication with devices other than the relay devices 11A, 11B, 11C. Therefore, the network communication being performed by the communication device 220 of the image forming apparatus 214 fails. During a time period (communication interruption time period T) in which the relay devices 11A, 11B, 11C interrupt communication with devices other than the relay devices 11A, 11B, 11C, the communication device 220 of the image forming apparatus 214 intermittently transmits multiple search packets P. Then, when any one of the multiple search packets P is received, the communication device 220 determines that the communication interruption time period T has ended, and stops transmitting search packets P and resumes communication with a network device. As a result, in the communication system 201, network communication can be appropriately resumed.

Here, the communication part 221 corresponds to a specific example of a "communication part" in the present invention. The communication control part 223 corresponds to a specific example of a "control part" in the present invention. The relay device 11C corresponds to a specific example of a "relay device" in the present invention. The search packet P corresponds to a specific example of a "search packet" in the present invention.

[Operation and Effect]

Next, operation and effect of the communication device 220 of the present embodiment is described.

(Overview of Overall Operation)

First, with reference to FIG. 1, an overview of an overall operation of the communication system 201 is described. The relay devices 11A, 11B 11C relay network communication. The communication device 220 of the image forming apparatus 214 acquires an IP address assigned by the DHCP server 12 by communicating with the DHCP server 12 via the network NET. The communication device 220 receives print data transmitted from the information processing apparatus 13 by communicating with the information processing apparatus 13 via the network NET. Then, the image forming apparatus 214 forms an image on a recording medium such as a sheet of paper based on the print data.

When a network device (for example, the image forming apparatus 914) is newly electrically connected to the network NET, the relay devices 11A, 11B, 11C detect a loop transmission path by performing a route search operation using a spanning tree protocol. During a time period in which the route search operation is performed, the relay devices 11A, 11B, 11C interrupt communication with devices other than the relay devices 11A, 11B, 11C. In this time period (communication interruption time period T), the communication device 220 of the image forming apparatus 214 intermittently transmits multiple search packets P. Then, when any one of the multiple search packets P is received, the communication device 220 stops transmitting search packets P and resumes network communication.

(Detailed Operation)

Figure 2:
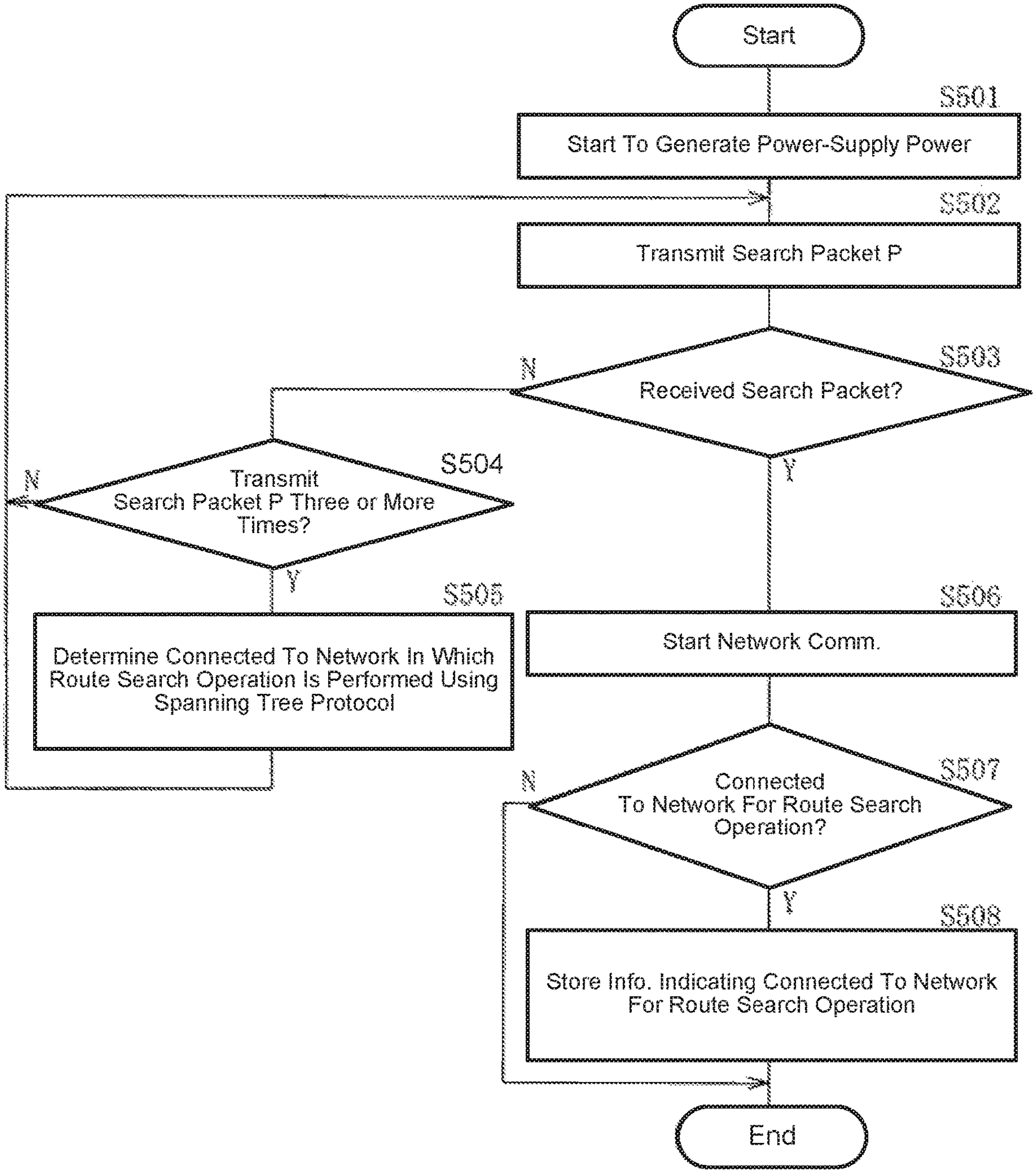
FIG. 2 is a flow diagram illustrating an operation example of a communication device illustrated in FIG. 1.
Figure 3:
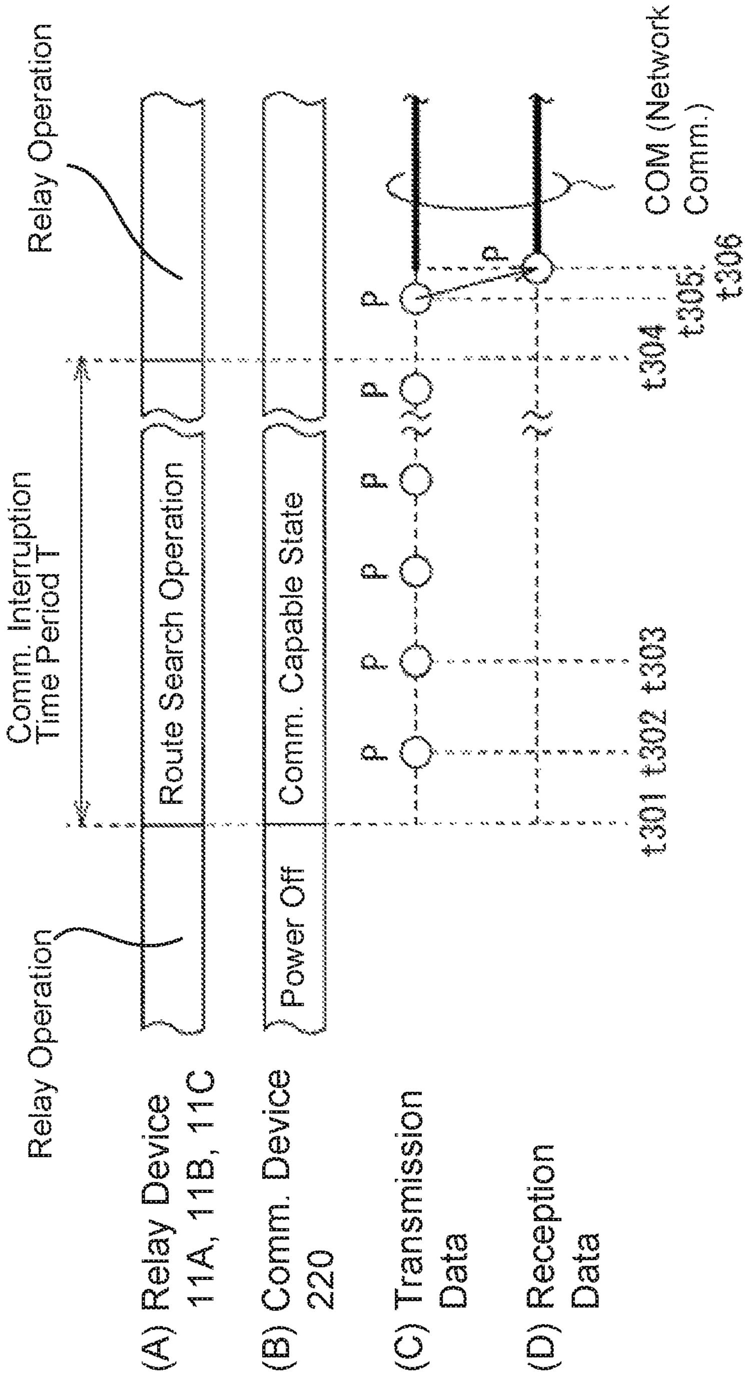
FIG. 3 is a timing chart illustrating an operation example of the communication system illustrated in FIG. 1.

FIG. 2 illustrates an operation example of the communication device 220 when a user turned on the power switch of the image forming apparatus 214. FIG. 3 illustrates an operation example of the communication system 201, in which (A) illustrates operations of the relay devices 11A, 11B, 11C, (B) illustrates an operation of the communication device 220, (C) illustrates transmission data of the communication device 220, and (D) illustrates reception data of the communication device 220. In the following, an example is described in which a user turns on the power switch of the image forming apparatus 214 and thereby the relay device 11C and the image forming apparatus 214 are electrically connected to each other. However, the present invention is not limited to this. For example, it is the same for a case where a user physically connects the image forming apparatus 214 in a state in which the power switch has been turned on to the relay device 11C using a LAN cable and thereby the relay device 11C and the image forming apparatus 214 are electrically connected to each other.

When the user turns on the power switch of the image forming apparatus 214, the power supply part 19 starts to generate power-supply power used in the communication device 220, the image forming control part 17, and the image forming part 18, based on the AC power supplied from the AC power supply AC (S501).

In the example of FIG. 3, the relay devices 11A, 11B, 11C perform a relay operation of network communication in a time period before a timing t301 ((A) in FIG. 3). Further, during this time period, the power switch of the image forming apparatus 214 is in an off state, and thus, power-supply power is not supplied to the communication device 220 ((B) in FIG. 3).

Then, at the timing t301, the user turns on the power switch of the image forming apparatus 214. Thus, the power-supply power generated by the power supply part 19 is supplied to the communication device 220, and the communication device 220 starts to operate. As a result, the communication device 220 is in a state capable of performing communication (or Communication Capable State) ((B) in FIG. 3).

In this way, when the communication device 220 starts to operate, the image forming apparatus 214 is electrically connected to the relay device 11C. When the relay device 11C detects that the image forming apparatus 214 is electrically connected, the relay devices 11A, 11B, 11C perform a route search operation using a spanning tree protocol ((A) in FIG. 3). As a result, the relay devices 11A, 11B, 11C interrupt communication with devices other than the relay devices 11A, 11B, 11C. In this way, a communication interruption time period T starts.

Next, the communication device 220 transmits a search packet P (S502). Specifically, the communication control part 223 generates a search packet P based on the search packet information INF1 stored in the storage part 222, and the communication part 221 transmits the search packet P by broadcast.

Next, the communication control part 223 of the communication device 220 confirms whether or not the communication part 221 has received the search packet P transmitted in S502 (S503). When the search packet P has not been received ("N" in S503), the communication environment detection part 224 of the communication control part 223 confirms whether or not the communication part 221 has transmitted the search packet P three or more times (S504). When the communication part 221 has not transmitted the search packet P three or more times ("N" in S504), the process returns to S502. When the communication part 221 has transmitted the search packet P three or more times ("Y" in S504), the communication environment detection part 224 determines that the communication device 220 is connected to a network in which a route search operation is performed using a spanning tree protocol (S505), and the process returns to S502. The communication device 220 repeats S502-S505 until the search packet P is received.

In the example of FIG. 3, at a timing t302, the communication device 220 transmits a first search packet P ((C) in FIG. 3). Since the relay devices 11A, 11B, 11C interrupt communication with devices other than the relay devices 11A, 11B, 11C, this search packet P is lost. Therefore, since the communication device 220 has not received this search packet P, the communication device 220 transmits a next search packet P at a timing t303. In this way, in this example, the communication device 220 intermittently transmits multiple search packets P at predetermined time intervals (for example, every 3 seconds). Then, in this example, since a search packet P is not received even though the communication part 221 has transmitted the search packet P three times, the communication environment detection part 224 determines that the communication device 220 is connected to a network in which a route search operation is performed using a spanning tree protocol.

When the search packet P is received in S503 ("Y" in S503), the communication device 220 starts network communication (S506). That is, when the search packet P is received, the communication device 220 determines that the communication interruption time period T has ended, and starts network communication.

In the example of FIG. 3, at a timing t304, the relay devices 11A, 11B, 11C end the route search operation (FIG. 3 (A)). As a result, the relay devices 11A, 11B, 11C release the interruption of communication with devices other than the relay devices 11A, 11B, 11C. In this way, the communication interruption time period T ends. Then, the relay devices 11A, 11B, 11C resume relay operations of network communication. Based on a processing result of the route search operation, the relay devices 11A, 11B, 11C control the communication such that a network packet is not transmitted in a loop.

At a subsequent timing t305, the communication device 220 transmits a search packet P ((C) in FIG. 3). Since this search packet P is for searching for its own apparatus and is broadcasted, the relay device 11C transmits this search packet P to the relay devices 11A and 11B and also transmits this search packet P to the communication device 220. Therefore, the communication device 220 receives this search packet P at a timing t306 ((D) in FIG. 3). As a result, the communication device 220 determines that the communication interruption time period T has ended, and starts network communication COM ((C) and (D) in FIG. 3).

After the timing t306, the communication device 220 transmits a network packet to the DHCP server 12 to perform an IP address assignment request, and receives a network packet that is transmitted from the DHCP server 12 and contains information about an assigned IP address. Then, the communication control part 223 of the communication device 220 acquires the IP address assigned by the DHCP server 12 based on the network packet, and performs network setting based on this IP address. Thereafter, the communication device 220 can perform network communication using this IP address. For example, the communication device 220 receives print data transmitted from the information processing apparatus 13 by communicating with the information processing apparatus 13 via the relay devices 11A, 11B, 11C (the network NET). Then, the image forming apparatus 214 forms an image on a recording medium such as a sheet of paper based on the print data.

Next, the communication environment detection part 224 of the communication device 220 confirms whether or not it has been determined in S505 that the communication device 220 is connected to a network in which a route search operation is performed using a spanning tree protocol (S507). When it is not determined that the communication device 220 is connected to a network in which a route search operation is performed ("N" in S507), this flow ends. The network is referred as "Network For Route Search Operation" in the drawings.

When it is determined in S507 that the communication device 220 is connected to a network in which a route search operation is performed ("Y" in S507), the communication environment detection part 224 of the communication device 220 stores information indicating that the communication device 220 is connected to a network in which a route search operation is performed (S508).

As a result, this flow ends.

In this way, when the communication device 220 is connected to a network in which a route search operation is performed using a spanning tree protocol, the communication environment detection part 224 stores information indicating that the communication device 220 is connected to a network in which a route search operation is performed. Then, the communication device 220 starts network communication. For example, when the communication device 220 performs network communication, the network communication may fail. Specifically, for example, when the communication device 220 of the image forming apparatus 214 is performing network communication with the information processing apparatus 13, when the other image forming apparatus 914 is electrically connected to the relay device 11C, the relay devices 11A, 11B, 11C start a route search operation and a communication interruption time period T starts. Therefore, the network communication being performed by the communication device 220 of the image forming apparatus 214 fails. In this case, depending on whether or not the communication device 220 is connected to a network in which a route search operation is performed, the communication device 220 controls a resume operation of the network communication. In the following, such a resume operation of network communication is described in detail.

Figure 4:
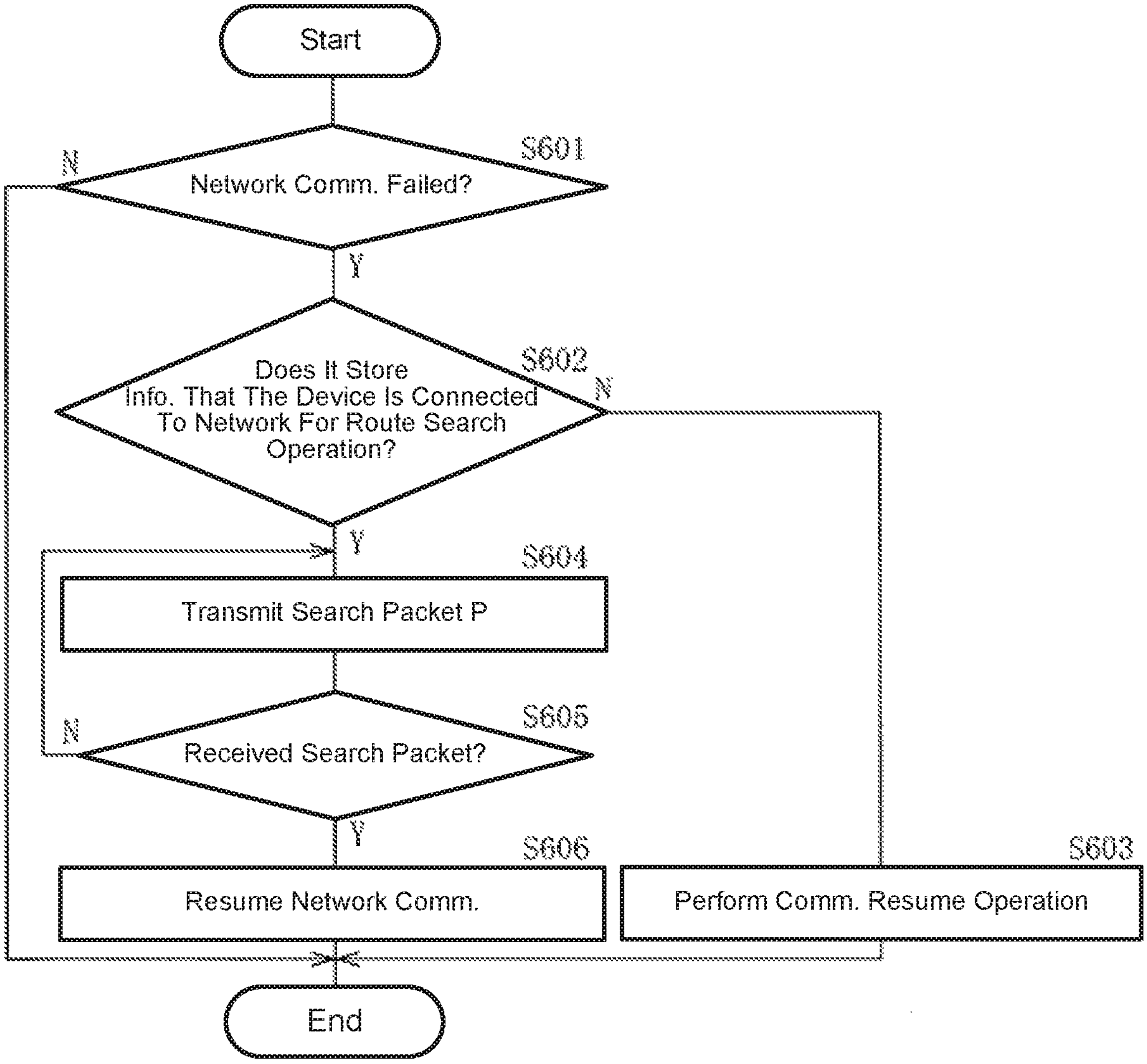
FIG. 4 is a flow diagram illustrating an operation example of the communication device illustrated in FIG. 1 when communication is resumed.
Figure 5:
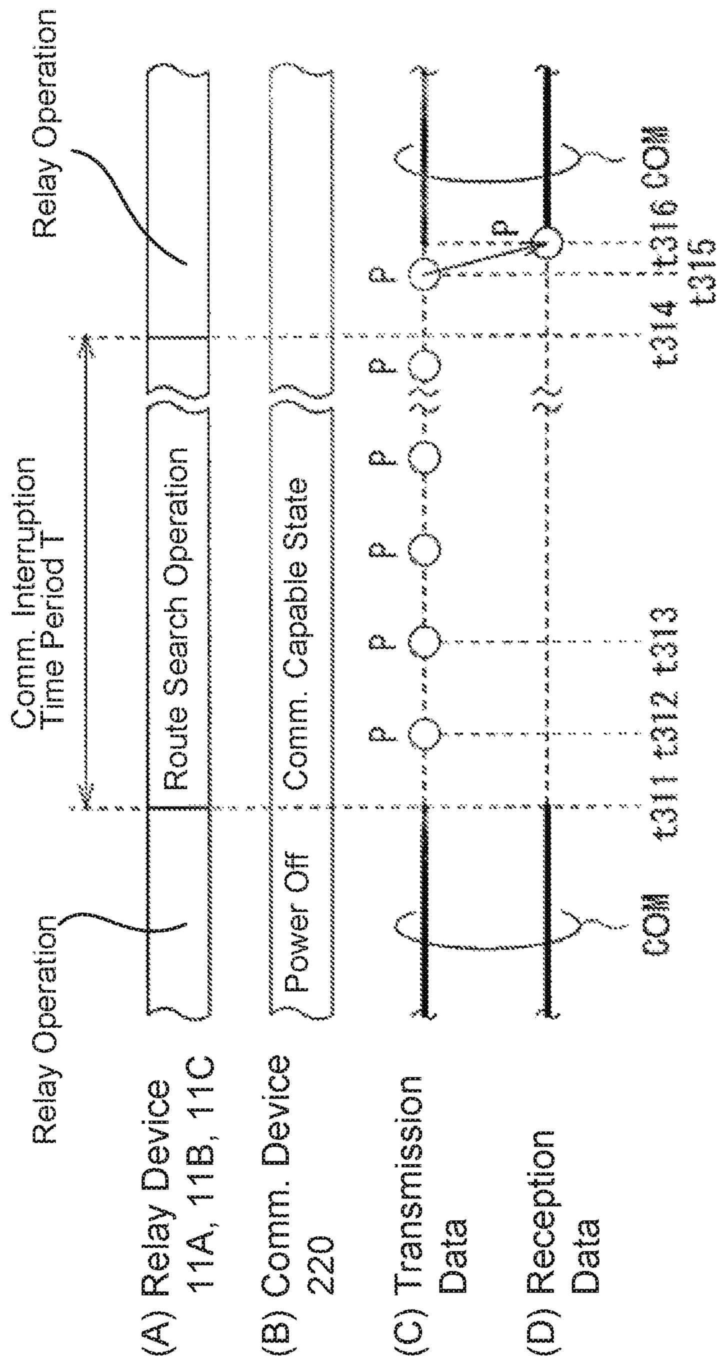
FIG. 5 is a timing chart illustrating an operation example of the communication system illustrated in FIG. 1 when communication is resumed.

FIG. 4 illustrates an example of a resume operation of network communication of the communication device 220. FIG. 5 illustrates an example of a resume operation of network communication in the communication system 201.

First, the communication control part 223 of the communication device 220 confirms whether or not network communication has failed (S601). When the network communication has succeeded ("N" in S601), this flow ends.

When network communication has failed in S601 ("Y" in S601), the communication environment detection part 224 of the communication device 220 confirms whether or not information indicating that the communication device 220 is connected to a network in which a route search operation is performed has been stored (S602). That is, when the communication device 220 is connected to a network in which a route search operation is performed using a spanning tree protocol, the communication environment detection part 224 stores information indicating that the communication device 220 is connected to a network in which a route search operation is performed in S508 (FIG. 2). Therefore, the communication environment detection part 224 confirms whether or not the information indicating that the communication device 220 is connected to a network in which a route search operation is performed has been stored.

In S602, when the information indicating that the communication device 220 is connected to a network in which a route search operation is performed has not been stored ("N" in S602), the communication device 220 performs a communication resume process (S603). That is, in this case, since the communication device 220 is not connected to a network in which a route search operation is performed, the communication device 220 performs a communication resume process using a general method such as transmitting a network packet and waiting for a response. Then, after network communication is resumed, this flow ends.

In S602, when the information indicating that the communication device 220 is connected to a network in which a route search operation is performed has been stored ("Y" in S602), the communication device 220 transmits a search packet P (S604). Specifically, the communication control part 223 generates a search packet P based on the search packet information INF1 stored in the storage part 222, and the communication part 221 transmits the search packet P by broadcast.

Next, the communication control part 223 of the communication device 220 confirms whether or not the communication part 221 has received the search packet P transmitted in S604 (S605). When the search packet P has not been received ("N" in S605), the process returns to S604. The communication device 220 repeats S604 and S605 until the search packet P is received.

In the example of FIG. 5, the communication device 220 performs network communication COM with, for example, the information processing apparatus 13 in a time period before a timing t311 ((C) and (D) in FIG. 5). Then, at the timing t311, the other image forming apparatus 914 is electrically connected to the relay device 11C. As a result, the relay devices 11A, 11B, 11C start a route search operation ((A) in FIG. 5), and a communication interruption time period T starts. As a result, the network communication COM being performed by the communication device 220 of the image forming apparatus 214 fails. In this example, since the communication device 220 is connected to the network NET in which a route search operation is performed using a spanning tree protocol, at a timing t312, the communication device 220 transmits a first search packet P ((C) in FIG. 5). Since the relay devices 11A, 11B, 11C interrupt communication with devices other than the relay devices 11A, 11B, 11C, this search packet P is lost. Therefore, since the communication device 220 has not received this search packet P, the communication device 220 transmits a next search packet P at a timing t313. In this way, in this example, the communication device 220 intermittently transmits multiple search packets P at predetermined time intervals (for example, every 3 seconds).

Then, when the search packet P is received in S605 ("Y" in S605), the communication device 220 resumes network communication (S606). That is, when the search packet P is received, the communication device 220 determines that the communication interruption time period T has ended, and resumes network communication.

In the example of FIG. 5, at a timing t314, the relay devices 11A, 11B, 11C end the route search operation ((A) in FIG. 5). As a result, the relay devices 11A, 11B, 11C release the interruption of communication with devices other than the relay devices 11A, 11B, 11C. In this way, the communication interruption time period T ends. Then, the relay devices 11A, 11B, 11C resume relay operations of network communication. Based on a processing result of the route search operation, the relay devices 11A, 11B, 11C control the communication such that a network packet is not transmitted in a loop.

At a subsequent timing t315, the communication device 220 transmits a search packet P ((C) in FIG. 5). Since this search packet P is for searching for its own apparatus and is broadcasted, the relay device 11C transmits this search packet P to the relay devices 11A and 11B and also transmits this search packet P to the communication device 220. Therefore, the communication device 220 receives this search packet P at a timing t316 ((D) in FIG. 5). As a result, the communication device 220 determines that the communication interruption time period T has ended, and resumes network communication COM ((C) and (D) in FIG. 5).

As a result, this flow ends.

In this way, the communication device 220 starts to transmit multiple search packets P when the image forming apparatus 214 is electrically connected to the relay device 11C, and starts network communication when any one of the multiple search packets P is received. As a result, in the communication device 220, the time period from the end of the communication interruption time period T to the start of network communication can be shortened.

That is, for example, a communication device can be configured such that the communication device starts network communication when a predetermined standby time period has elapsed after an image forming apparatus is electrically connected to a relay device. In this case, for example, even when a route search operation is completed in a short time, the communication device does not start network communication until this standby time period has elapsed. Therefore, there is a risk that the time period from the end of the communication interruption time period T to the start of network communication may be long. Further, when the configuration of the network is changed, a time period for performing the route search operation changes and the length of the communication interruption time period T may change. Therefore, for example, when an administrator tries to appropriately set the standby time period in order to shorten the time period to start network communication, each time the configuration of the network is changed, the administrator has to set this standby time period, so this is troublesome for the administrator.

On the other hand, the communication device 220 starts to transmit multiple search packets P when the image forming apparatus 214 is electrically connected to the relay device 11C, and starts network communication when any one of the multiple search packets P is received. As a result, the communication device 220 can start network communication after confirming that the communication interruption time period T has ended. Therefore, in the communication device 220, the timing to start network communication can be appropriately set according to the length of the communication interruption time period T. Specifically, when the length of the communication interruption time period T is short, the timing to start network communication can be advanced, and when the length of the communication interruption time period T is long, the timing to start network communication can be delayed. In this way, in the communication device 220, the timing to start network communication can be appropriately set according to the length of the communication interruption time period T. Therefore, the time period from the end of the communication interruption time period T to the start of network communication can be shortened. Further, even when the configuration of the network changes, in the communication device 220, the timing to start network communication can be appropriately set according to the length of the communication interruption time period T. Therefore, the administrator does not need to set the standby time period, and thus, burden on the administrator can be reduced.

Further, in the communication device 220, when network communication fails, a resume operation of network communication is controlled according to whether or not the communication device 220 is connected to a network in which a route search operation is performed. That is, as illustrated in FIG. 4, when the communication device 220 is not connected to a network in which a route search operation is performed ("N" in S602), the communication device 220 resumes network communication after a relatively short time period (first time period) has elapsed by performing a communication resume operation (S603). Further, when the communication device 220 is connected to a network in which a route search operation is performed ("Y" in S602), the communication device 220 intermittently transmits multiple search packets P for searching for the image forming apparatus 214 which is its own apparatus, and resumes network communication when any one of the multiple search packets P is received. In other words, the communication device 220 waits for the route search operation to end and resumes network communication after a time period (second time period) longer than the first time period has elapsed. In this way, in the communication device 220, the resume operation of network communication is controlled according to whether or not the communication device 220 is connected to a network in which a route search operation is performed. Therefore, network communication can be appropriately resumed.

[Effects]

As described above, in the present embodiment, when network communication fails, the resume operation of network communication is controlled according to whether or not the communication device 220 is connected to a network in which a route search operation is performed. Therefore, network communication can be appropriately resumed.

First Modified Embodiment

In the above embodiment, as illustrated in FIG. 4, in the case where the communication device 220 is connected to a network in which a route search operation is performed, when network communication fails, the communication device 220 intermittently transmits multiple search packets P and resumes network communication when any one of the multiple search packets P is received. However, the present invention is not limited to this. Instead of this, for example, it is also possible to resume network communication after waiting for a predetermined time period. In the following, the present modified embodiment is described in detail.

Similarly to the communication system 201 (FIG. 1) according to the above embodiment, a communication system 201A according to the present modified embodiment includes an image forming apparatus 214A. The image forming apparatus 214A has a communication device 220A. The communication device 220A has a communication control part 223A.

Figure 6:
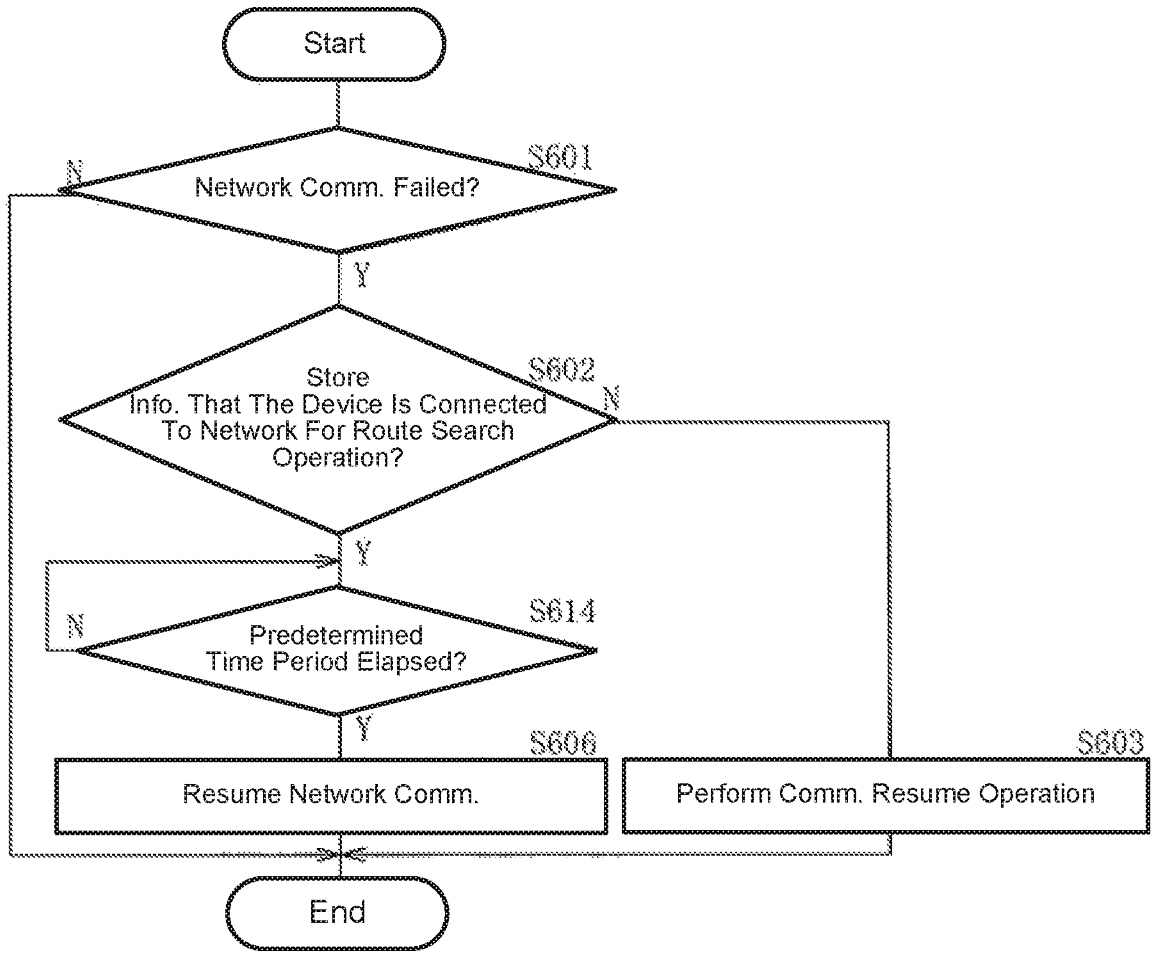
FIG. 6 is a flow diagram illustrating an operation example of a communication device according to a modified embodiment when communication is resumed.

FIG. 6 illustrates an example of a resume operation of network communication of the communication device 220A.

First, similar to the communication device 220 according to the above embodiment, the communication device 220A confirms whether or not network communication has failed (S601). When network communication has failed ("Y" in S601), the communication environment detection part 224 of the communication device 220A confirms whether or not the information indicating that the communication device 220A is connected to a network in which a route search operation is performed has been stored (S602).

In S602, when information indicating that the communication device 220A is connected to a network in which a route search operation is performed has been stored ("Y" in S602), the communication control part 223A of the communication device 220A confirms whether or not a predetermined time period has elapsed after the network communication fails (S614). The predetermined time period is desirably, for example, equal to or slightly longer than a general communication interruption time period T. For example, this predetermined time period is set to 60 seconds. When the predetermined time period has not yet elapsed ("N" in S614), S614 is repeated until the predetermined time period has elapsed.

Then, when the predetermined time period has elapsed ("Y" in S614), the communication device 220A determines that the communication interruption time period T has ended, and resumes network communication COM (S606). As a result, this flow ends.

Figure 7:
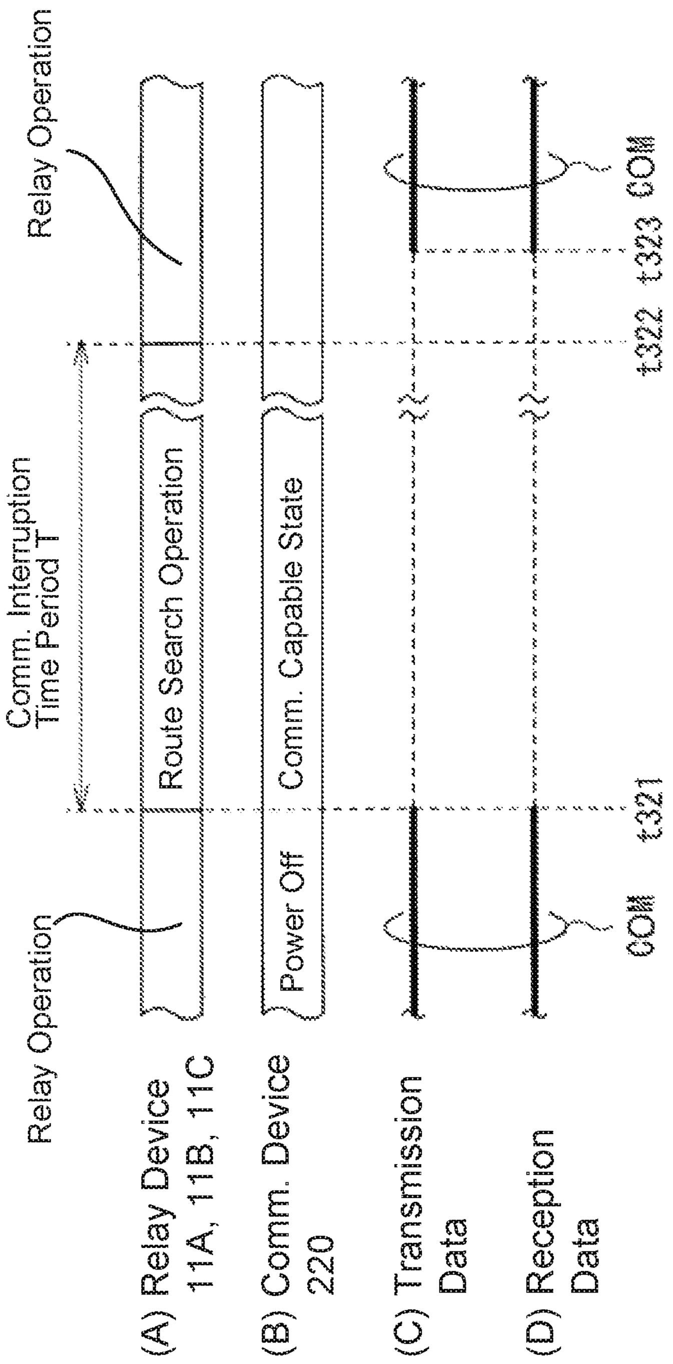
FIG. 7 is a timing chart illustrating an operation example of a communication system according to the modified embodiment when communication is resumed.

FIG. 7 illustrates an operation example of the communication system 201A. The communication device 220A performs network communication COM with, for example, the information processing apparatus 13 in a time period before a timing t321 ((C) and (D) in FIG. 7).

When the other image forming apparatus 914 is electrically connected to the relay device 11C at the timing t321, the relay devices 11A, 11B, 11C start a route search operation ((A) in FIG. 7), and a communication interruption time period T starts. As a result, the network communication COM being performed by the communication device 220A of the image forming apparatus 214A fails. In this example, since the communication device 220A is connected to the network NET in which a route search operation is performed, the communication device 220A waits from the timing t321 at which the network communication COM has failed to a timing t323 at which a predetermined time period has elapsed.

In this example, at a timing t322, the relay devices 11A, 11B, 11C end the route search operation ((A) in FIG. 7). As a result, the relay devices 11A, 11B, 11C release the interruption of communication with devices other than the relay devices 11A, 11B, 11C. In this way, the communication interruption time period T ends. Then, the relay devices 11A, 11B, 11C resume relay operations of network communication.

Then, at the timing t323 when the predetermined time period has elapsed after the network communication fails, the communication device 220A determines that the communication interruption time period T has ended and resumes the network communication COM ((C) and (D) in FIG. 7).

In this way, the communication device 220A starts to transmit multiple search packets P after the predetermined time period has elapsed after the network communication fails. Therefore, the communication device 220A can avoid transmitting wasted search packets P, and thus, a load on the communication device 220A can be reduced.

Second Modified Embodiment

In the above embodiment, as illustrated in FIG. 4, when the communication device 220 is connected to a network in which a route search operation is performed, after network communication fails, the communication device 220 starts to intermittently transmit multiple search packets P. However, the present invention is not limited to this. Instead of this, for example, it is also possible that the communication device starts to intermittently transmit multiple search packets P after a standby time period has elapsed after the network communication fails. In the following, the present modified embodiment is described in detail.

Figure 8:
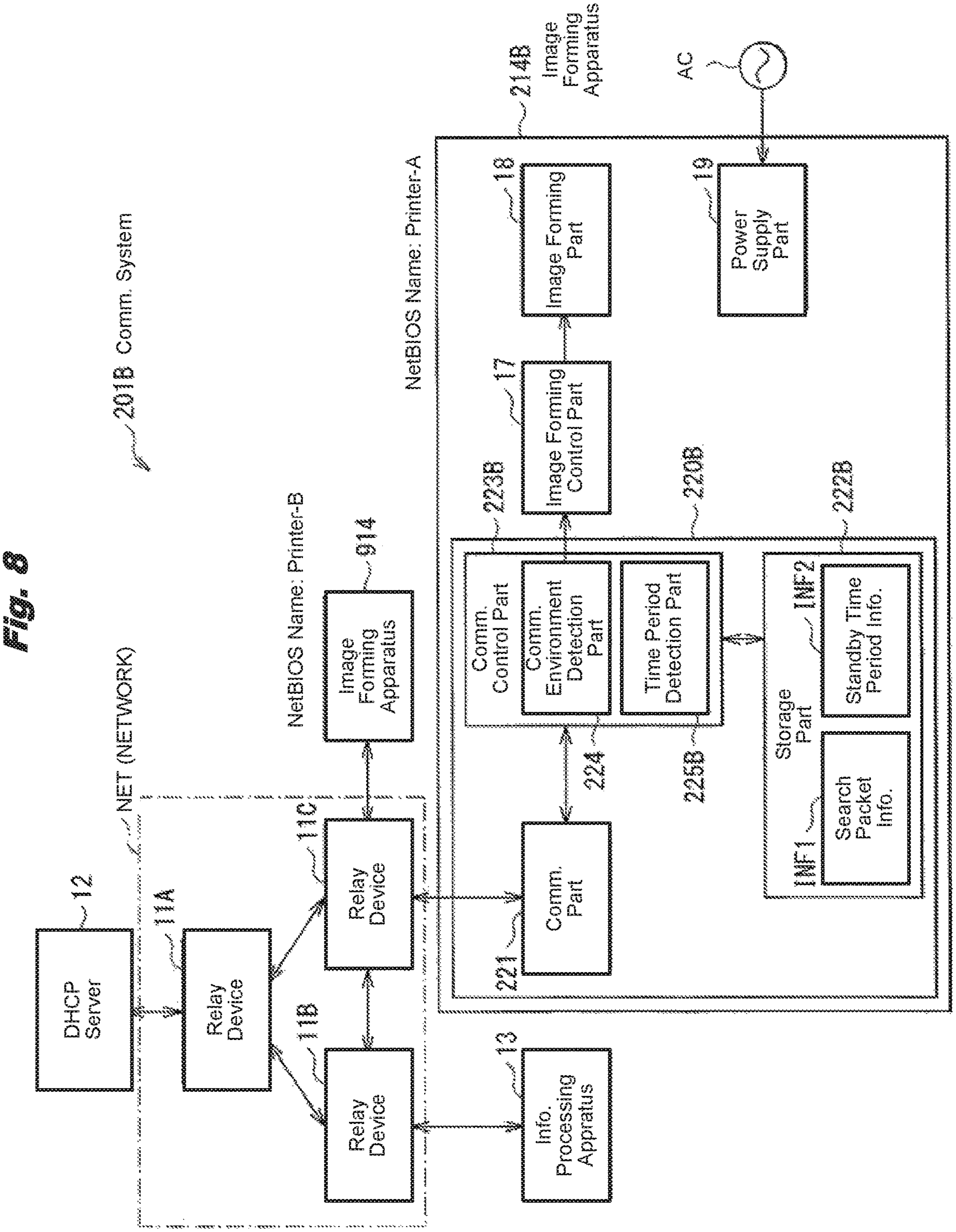
FIG. 8 is a block diagram illustrating a configuration example of a communication system according to another modified embodiment.

FIG. 8 illustrates a configuration example of a communication system 201B according to the present modified embodiment. The communication system 201B includes an image forming apparatus 214B. The image forming apparatus 214B has a communication device 220B. The communication device 220B has a storage part 222B and a communication control part 223B.

The storage part 222B stores the search packet information INF1 and standby time period information INF2. The standby time period information INF2 includes information about a standby time period (standby time period T2) from when the network communication fails to when intermittent transmission of multiple search packets P starts.

The communication control part 223B is configured to control a communication operation of the communication device 220B. The communication control part 223B has a time period detection part 225B. The time period detection part 225B is configured to measure a reception time period T1 from when network communication fails to when a search packet P is received. Then, based on the reception time period T1, the time period detection part 225B calculates a standby time period T2 to be used when network communication fails next time. The communication control part 223B stores information about the standby time period T2 in the storage part 222B as the standby time period information INF2.

For example, after the standby time period T2 indicated by the standby time period information INF2 stored in the storage part 222B has elapsed after the network communication fails, the communication control part 223B controls the communication part 221 to intermittently transmit multiple search packets P based on the search packet information INF1 stored in storage part 222B. Then, when the communication part 221 receives any one of the multiple search packets P, the communication control part 223B controls the communication part 221 to stop transmitting search packets P and resume the network communication.

Here, the communication control part 223B corresponds to a specific example of a "control part" in the present invention. The storage part 222B corresponds to a specific example of "storage part" in the present invention. The standby time period information INF2 corresponds to a specific example of "standby time period information" in the present invention. The standby time period T2 corresponds to a specific example of a "standby time period" in the present invention. The reception time period T1 corresponds to a specific example of a "reception time period" in the present invention.

Figure 9:
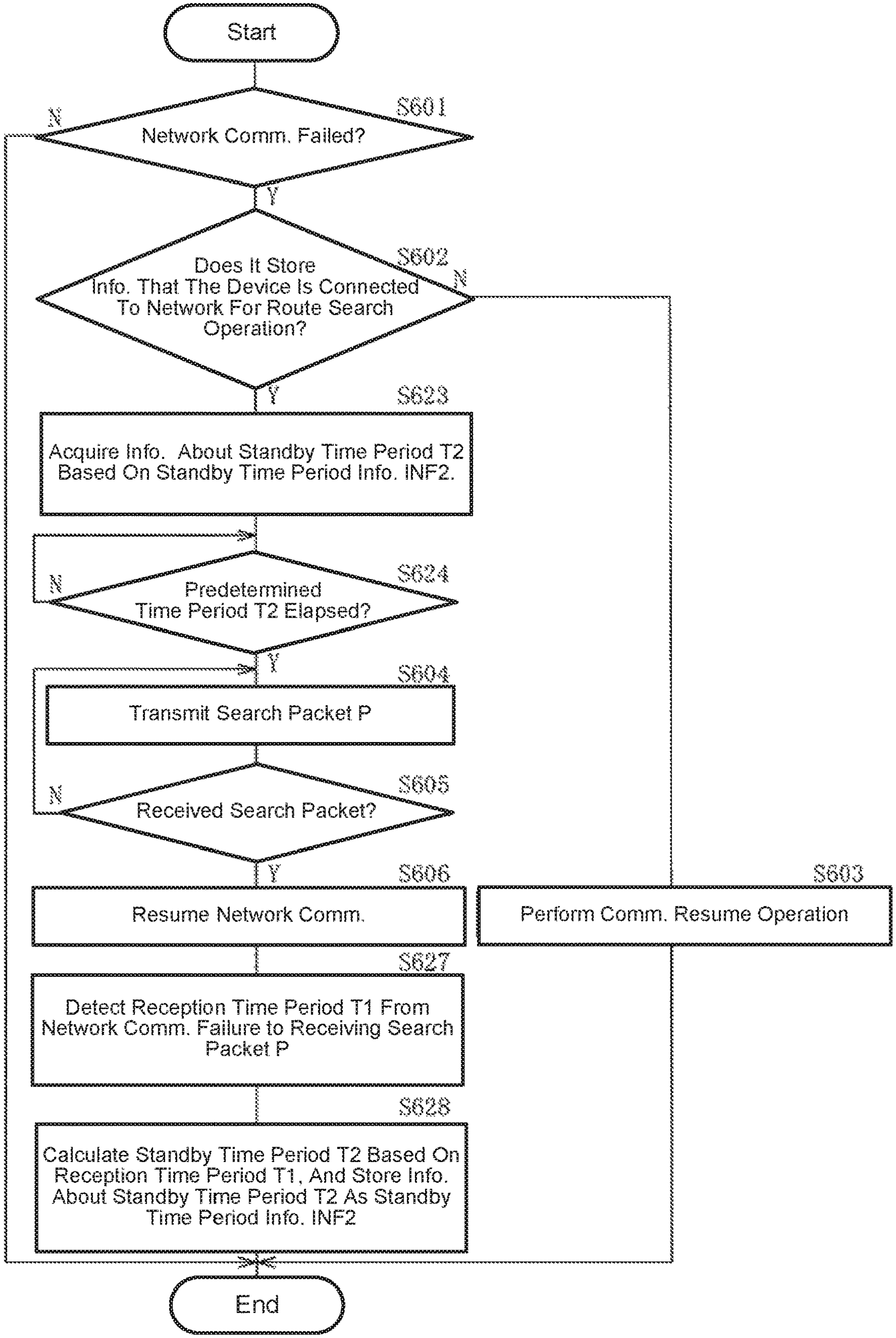
FIG. 9 is a flow diagram illustrating an operation example of a communication device illustrated in FIG. 8 when communication is resumed.

FIG. 9 illustrates an example of a resume operation of network communication of the communication device 220B.

First, similar to the communication device 220 according to the above embodiment, the communication device 220B confirms whether or not network communication has failed (S601). When network communication has failed ("Y" in S601), the communication environment detection part 224 of the communication device 220B confirms whether or not the information indicating that the communication device 220B is connected to a network in which a route search operation is performed has been stored (S602).

In S602, when the information indicating that the communication device 220B is connected to a network in which a route search operation is performed has been stored ("Y" in step S602), the communication control part 223B of the communication device 220B acquires information about the standby time period T2 based on the standby time period information INF2 stored in the storage part 222B (S623).

Next, the communication control part 223B of the communication device 220B confirms whether or not the standby time period T2 has elapsed after the network communication fails (S624). When the standby time period T2 has not yet elapsed ("N" in S624), the communication control part 223B repeats S624 until the standby time period T2 has elapsed.

In S624, when the standby time period T2 has elapsed ("Y" in S624), the communication device 220B transmits a search packet P (S604).

Next, the communication control part 223B of the communication device 220B confirms whether or not the communication part 221 has received the search packet P transmitted in S604 (S605). When the search packet P has not been received ("N" in S605), the process returns to S604, and S604 and S605 are repeated until the communication device 220B receives the search packet P.

When the search packet P is received in S605 ("Y" in S605), the communication device 220B resumes network communication (S606).

Next, the time period detection part 225B of the communication device 220B detects a reception time period T1 from when the network communication fails to when the search packet P is received (S627).

Then, based on the reception time period T1 detected in S627, the time period detection part 225B calculates a standby time period T2 to be used when network communication fails next time, and the communication control part 223B stores information about the standby time period T2 in the storage part 222B as the standby time period information INF2 (S628).

As a result, this flow ends.

Figure 10:
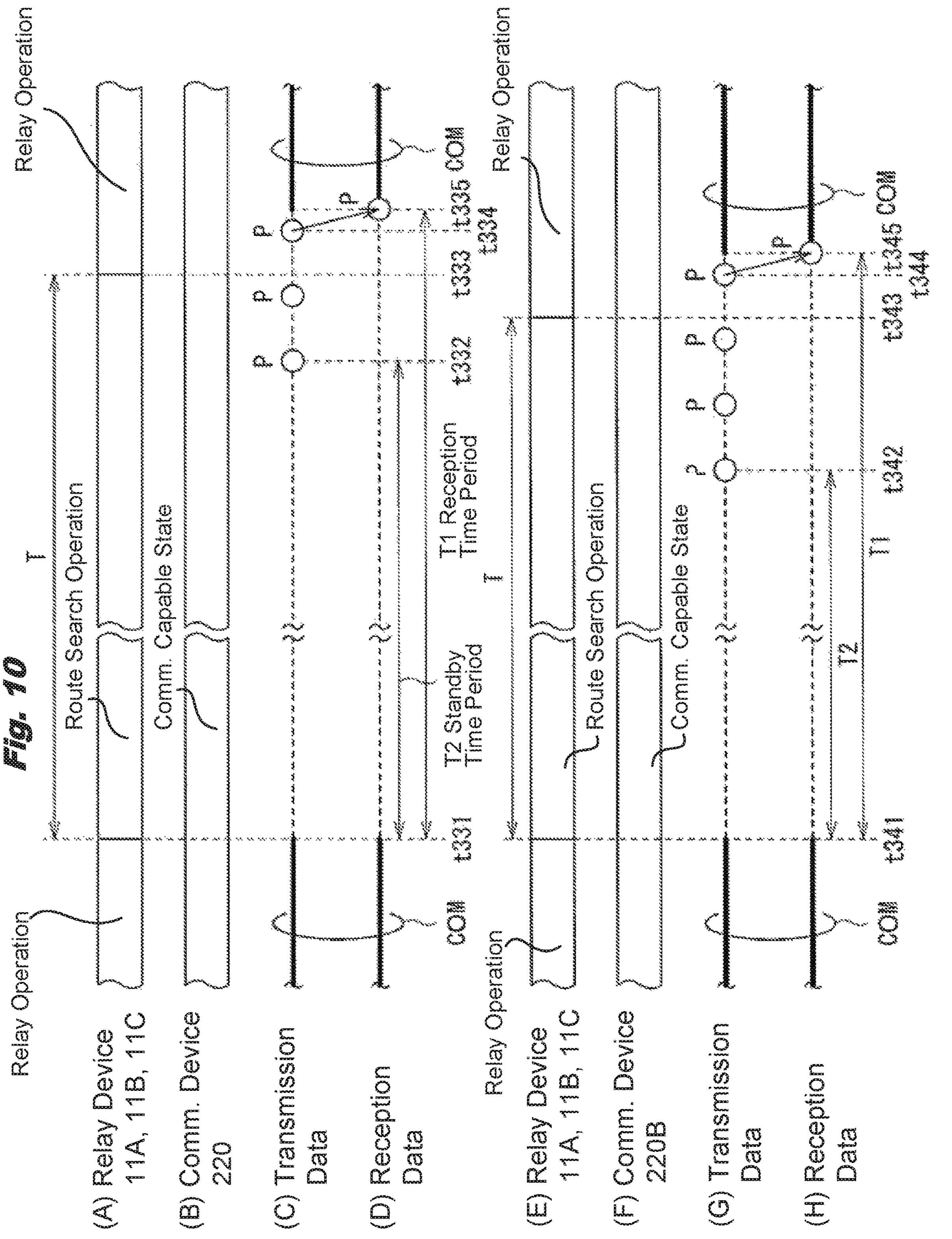
FIG. 10 is a timing chart illustrating an operation example of the communication system illustrated in FIG. 8 when communication is resumed.

FIG. 10 illustrates an operation example of the communication system 201B, in which (A) and (E) illustrate operations of the relay devices 11A, 11B 11C, (B) and (F) illustrate operations of the communication device 220B, (C) and (G) illustrate transmission data of the communication device 220B, and (D) and (H) illustrate reception data of the communication device 220B. (A)-(D) illustrate operations when network communication fails, and (E)-(H) illustrate operations when network communication fails next time.

In the example of (A)-(D) in FIG. 10, the communication device 220B performs network communication COM with, for example, the information processing apparatus 13 in a time period before a timing t331 ((C) and (D) in FIG. 10). Then, at the timing t331, the other image forming apparatus 914 is electrically connected to the relay device 11C. The relay devices 11A, 11B, 11C start a route search operation using a spanning tree protocol ((A) in FIG. 10), and a communication interruption time period T starts. As a result, the network communication COM being performed by the communication device 220B of the image forming apparatus 214B fails.

The communication control part 223B acquires information about the standby time period T2 based on the standby time period information INF2 stored in the storage part 222B. Then, at a timing t332 when the standby time period T2 has elapsed after the network communication fails, the communication device 220B transmits a first search packet P ((C) in FIG. 10). In this example, the communication device 220B intermittently transmits multiple search packets P thereafter.

At a timing t333, the relay devices 11A, 11B, 11C complete the route search operation ((A) in FIG. 10), and the communication interruption time period T ends. The relay devices 11A, 11B, 11C resume relay operations of network communication. Thereafter, at a timing t334, the communication device 220B transmits a search packet P ((C) in FIG. 10), and at a timing t335, the communication device 220B receives this search packet P ((D) in FIG. 10). As a result, the communication device 220B determines that the communication interruption time period T has ended, and resumes network communication COM ((C) and (D) in FIG. 10).

The time period detection part 225B detects a reception time period T1 from when the network communication fails to when the search packet P is received (from the timing t331 to the timing t335). Then, based on the reception time period T1, the time period detection part 225B calculates a standby time period T2 to be used when network communication fails next time. Specifically, the time period detection part 225B calculates the standby time period T2 such that the standby time period T2 is shorter than the reception time period T1. Then, the communication control part 223B stores information about the standby time period T2 in the storage part 222B as the standby time period information INF2.

Thereafter, the communication device 220B performs network communication COM. Then, as illustrated in (E)-(H) in FIG. 10, as a timing t341, the image forming apparatus 914 is connected to the relay device 11C. Then, the relay devices 11A, 11B, 11C start a route search operation using a spanning tree protocol ((E) in FIG. 10), and a communication interruption time period T starts. As a result, the network communication COM being performed by the communication device 220B of the image forming apparatus 214B fails.

The communication control part 223B acquires information about the standby time period T2 based on the standby time period information INF2 stored in the storage part 222B. Then, at a timing t342 when the standby time period T2 has elapsed after the network communication COM fails, the communication device 220B transmits a first search packet P ((G) in FIG. 10). In this example, the communication device 220B intermittently transmits multiple search packets P thereafter.

At a timing t343, the relay devices 11A, 11B, 11C complete the route search operation ((E) in FIG. 10), and the communication interruption time period T ends. The relay devices 11A, 11B, 11C resume relay operations of network communication. In this example, the route search operation is completed in a shorter time period than the previous operation illustrated in (A)-(D) of FIG. 10. Thereafter, at a timing t344, the communication device 220B transmits a search packet P ((G) in FIG. 10), and at a timing t345, the communication device 220B receives this search packet P ((H) in FIG. 10). As a result, the communication device 220B determines that the communication interruption time period T has ended, and resumes network communication COM ((G) and (H) in FIG. 10).

Then, the time period detection part 225B detects a reception time period T1 from when the network communication fails to when the search packet P is received (from the timing t341 to the timing t345), and, based on this reception time period T1, calculates a standby time period T2 to be used when network communication fails next time. Then, the communication control part 223B stores information about the standby time period T2 in the storage part 222B as the standby time period information INF2.

Figure 11:
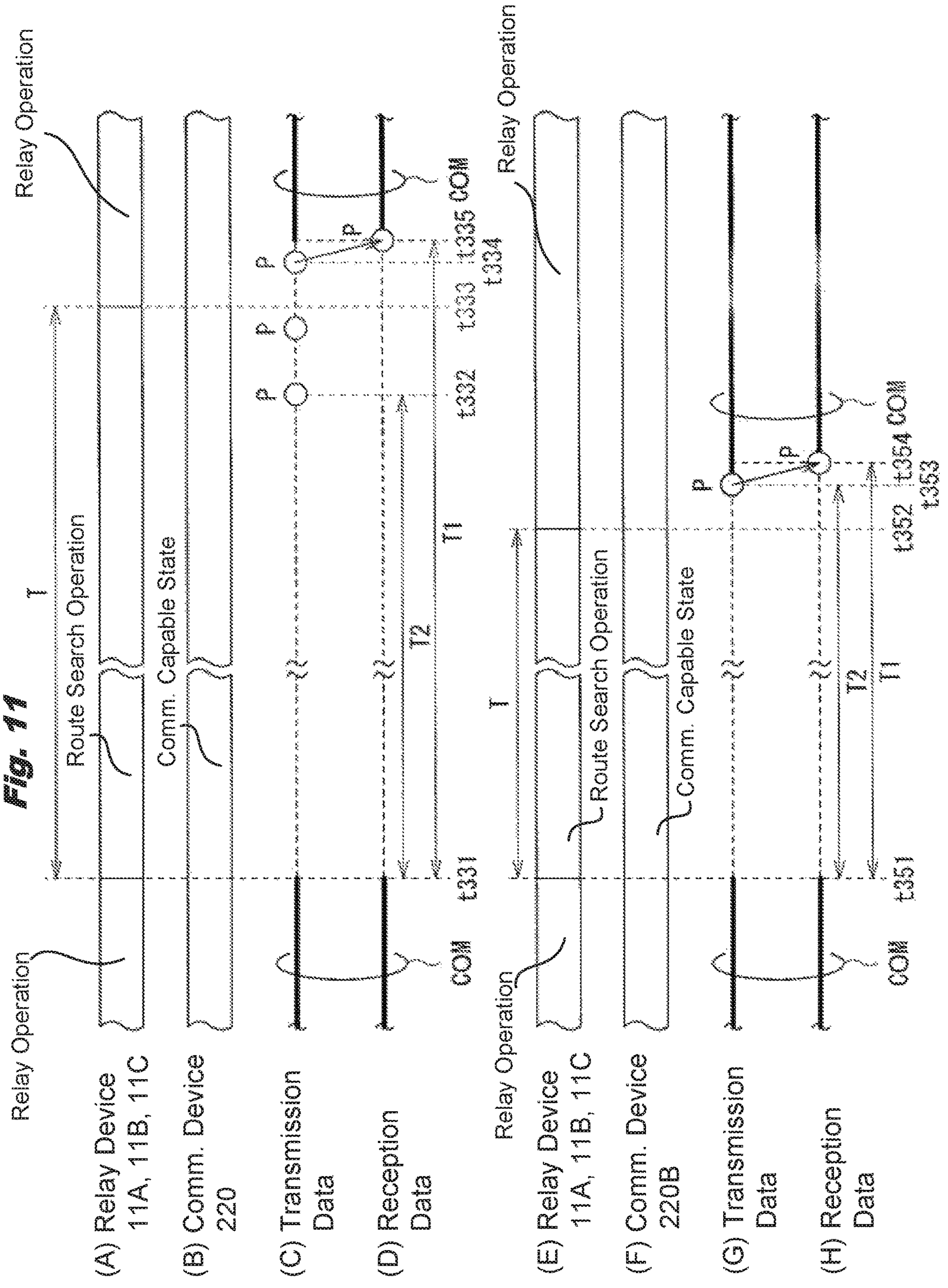
FIG. 11 is a timing chart illustrating another operation example of the communication system illustrated in FIG. 8 when communication is resumed.

FIG. 11 illustrates another operation example of the communication system 201B. (A)-(D) in FIG. 11 are the same as (A)-(D) in FIG. 10.

In the example of (E)-(H) in FIG. 11, the relay devices 11A, 11B, 11C perform a route search operation using a spanning tree protocol during a time period from a timing t351 to a timing t352 ((E) in FIG. 11). In this example, as compared to the case of (E)-(H) in FIG. 10, the route search operation is completed in a short time period.

At a timing t353 when the standby time period T2 has elapsed after the network communication COM fails, the communication device 220B transmits a first search packet P ((G) in FIG. 11). Then, the communication device 220B receives this search packet P at a timing t354 ((H) in FIG. 11). As a result, the communication device 220B determines that the communication interruption time period T has ended, and resumes network communication COM ((G) and (H) in FIG. 11).

Then, the time period detection part 225B detects a reception time period T1 from when the network communication fails to when the search packet P is received (from the timing t351 to the timing t354), and, based on this reception time period T1, calculates a standby time period T2 to be used when network communication fails next time. Then, the communication control part 223B stores information about the standby time period T2 in the storage part 222B as the standby time period information INF2.

In this way, the communication device 220B starts to transmit multiple search packets P after the standby time period T2 has elapsed after the network communication fails. Therefore, the communication device 220B can avoid transmitting wasted search packets P, and thus, a load on the communication device 220B can be reduced.

Further, the communication device 220B detects a reception time period T1 from when the network communication fails to when the search packet P is received, and, based on this reception time period T1, calculates a standby time period T2 to be used when network communication fails next time. As a result, in the communication device 220B, a standby time period T2 corresponding to the communication interruption time period T in the communication system 201B can be obtained. Therefore, for example, as compared to the case where a fixed predetermined time period is set as the standby time period T2, the timing for resuming network communication can be appropriately set.

In particular, in the communication device 220B, the standby time period T2 is calculated such that the standby time period T2 is shorter than the reception time period T1. As a result, in the communication device 220B, for example, as illustrated in FIG. 10, in the case where, due to a change in the configuration of the network, the time period in which the route search operation is performed is shortened and the communication interruption time period T is shortened, a time period before resuming network communication can be shortened. That is, for example, in the case where a fixed standby time period T2 is used, for example, when a time period in which a route search operation is performed is shortened due to a change in the configuration of the network, the time from when the route search operation ends to when the first search packet P is transmitted is wasted. On the other hand, in the communication device 220B, the standby time period T2 is calculated such that the standby time period T2 is shorter than the reception time period T1. As a result, for example, as illustrated in FIG. 10, transmission of multiple search packets P can be started before the end of the route search operation. As a result, in the communication device 220B, the time period from when the communication interruption time period T ends to when the network communication is resumed can be shortened.

Third Modified Embodiment

In the above embodiment, when communication fails, the communication device 220 resumes network communication when one of multiple transmitted search packets P is received. However, the present invention is not limited to this. For example, it is also possible that network communication is resumed after two or more of the transmitted search packets P are received.

Fourth Modified Embodiment

In the above embodiment, the communication device 220 stops transmitting search packets P when any one of multiple transmitted search packets P is received. However, the present invention is not limited to this. For example, it is also possible that, after any one of the multiple transmitted search packets P is received, some more search packets P are transmitted.

In the above, the present technology has been described by illustrating an embodiment and a few modified embodiments. However, the present technology is not limited to these embodiments or the like, and various modifications are possible.

For example, in the above embodiments, the present technology is applied to an image forming apparatus. However, without being limited to this, the present technology can be applied to various network devices having a network interface.

What is claimed is:

1. A communication device, comprising:

a communication part configured to communicate with a network device via a relay device; and a control part controlling an operation of the communication part such that, in a case where communication of the communication part fails, when the relay device is not a device that performs a route search operation using a spanning tree protocol, the communication part resumes communication with the network device after a first time period has elapsed, and when the relay device is a device that performs the route search operation, the communication part intermittently transmits a plurality of search packets including itself as a transmission target to the relay device and resumes communication with the network device after a second time period longer than the first time period has elapsed, wherein the second time period is a time period from when communication of the communication part fails to when any one of the plurality of search packets is received.

2. The communication device according to claim 1, further comprising:

a storage part that stores standby time period information indicating a standby time period from when communication of the communication part fails to when the communication part transmits the plurality of search packets, wherein the control part determines, based on the standby time period information, a timing at which the communication part starts transmitting the plurality of search packets.

3. The communication device according to claim 2, wherein the control part measures a reception time period from when communication of the communication part fails to when any one of the plurality of search packets is received, and, based on the reception time period, calculates the standby time period and stores the standby time period information indicating the standby time period in the storage part.

4. The communication device according to claim 3, wherein the control part calculates the standby time period such that the standby time period is shorter than the reception time period.

5. The communication device according to claim 1, wherein the control part performs control such that, when communication of the communication part fails, when the relay device is a device that performs the route search operation, the communication part waits until the second time period has elapsed, and resumes communication with the network device after the waiting.

6. The communication device according to claim 1, wherein the control part performs the control of the operation of the communication part such that, in an initial operation after the communication part and the relay device are electrically connected to each other, the communication part transmits a predetermined number of search packets including itself as a transmission target to the relay device and detects whether or not the predetermined number of search packets cannot be received, and thereby, determines whether or not the relay device is a device that performs the route search operation.

7. The communication device according to claim 6, wherein the communication part and the relay device are electrically connected to each other when power is supplied to the communication part and the communication part and the relay device are physically connected to each other.

8. A communication method, comprising:

establishing a communication between a communication part and a network device via a relay device;

determining that communication of the communication part has failed;

determining whether or not the relay device is not a device that performs a route search operation using a spanning tree protocol;

when the relay device is not a device that performs a route search operation using a spanning tree protocol, resuming the communication between the communication part and the network device after a first time period has elapsed; and when the relay device is a device that performs the route search operation, intermittently transmitting a plurality of search packets to the relay device, and resuming the communication between the communication part and the network device after a second time period longer than the first time period has elapsed, wherein the second time period is a time period from when the communication of the communication part is determined to have failed, to when any one of the plurality of search packets is received by the communication part.

9. The communication method according to claim 8, further comprising:

storing, in a storage part, standby time period information indicating a standby time period from when the communication of the communication part is determined have failed, to when the communication part transmits the plurality of search packets; and determining, based on the standby time period information, a timing at which the communication part transmits the plurality of search packets.

10. The communication method according to claim 9, further comprising:

measuring a reception time period from when the communication of the communication part is determined have failed, to when any one of the plurality of search packets is received;

calculating, based on the reception time period, the standby time period; and storing the standby time period information indicating the standby time period in the storage part.

11. The communication method according to claim 10, wherein the standby time period is calculated such that the standby time period is shorter than the reception time period.

12. The communication method according to claim 8, further comprising:

when the relay device is a device that performs the route search operation, waiting until the second time period has elapsed, and resuming the communication between the communication part and the network device after the second time period has elapsed.

13. The communication method according to claim 8, further comprising:

electrically connecting the communication part and the relay device are electrically connected to each other;

transmitting a predetermined number of search packets to the relay device;

detecting whether or not the predetermined number of search packets cannot be received; and based on a result of the detection, determining whether or not the relay device is a device that performs the route search operation, wherein the predetermined number of search packets include the communication part as a transmission target, and.

14. The communication method according to claim 13, further comprising:

electrically connecting the communication part and the relay device when power is supplied to the communication part, wherein the communication part and the relay device are physically connected to each other.

* * * * *